May 7, 1935.   W. M. BAILEY   2,000,686
VARIABLE MICA CONDENSER
Filed Jan. 16, 1929   2 Sheets-Sheet 1

Inventor:
William M. Bailey
By his Attorney
Philip Farnsworth

May 7, 1935.  W. M. BAILEY  2,000,686
VARIABLE MICA CONDENSER
Filed Jan. 16, 1929   2 Sheets-Sheet 2

Inventor:
William M. Bailey
By his Attorney
Philip Farnsworth

Patented May 7, 1935

2,000,686

UNITED STATES PATENT OFFICE 2,000,686

VARIABLE MICA CONDENSER

William M. Bailey, Lynn, Mass., assignor, by mesne assignments, to General Electric Company, a corporation of New York Application January 16, 1929, Serial No. 332,920

16 Claims. (Cl. 175—41.5)

This invention relates to capacitors and has for its object to provide a unit of precisely the desired value of capacity which is capable of retaining such value substantially constant.

Difficulty is experienced in obtaining the precise value desired for a capacitor and also in maintaining that value constant. One factor affecting the constancy of the capacitor is temperature change, such temperature variations causing a change in the clamping pressure under which the capacitor is built and this in turn causes a change in capacity. Another factor affecting the constancy of the capacitor is mechanical shock or vibration, which may loosen the clamp. Outside influences especially with high frequencies may also affect the value of a capacitor.

In order to obtain a greater approach toward perfection than has heretofore been practicable, recourse is had to a number of features contributing to precision and constancy. In the preferred embodiment, use is made of a mica and aluminum foil stack having the armatures connected in any desired manner, such as multiple series or otherwise, and mounted on a clamping frame of heavier and more rigid construction than is customary. The stack is placed under pressure of from 200 to 500 lbs. per square inch so that pressure variations affect the stack apparently not at all within these limits of pressure mentioned.

The various mica and foil layers cannot be perfectly uniform in thickness throughout. To reduce the error due to the cumulative effect of inaccuracies in thicknesses of layers which cause one side of the stack to be of different length and ordinarily cause the stack to be under different pressure on one side from on another, one end plate of the stack is mounted so that it may tilt slightly if necessary in transmitting the pressure substantially equally along all sides of the stack. This is accomplished for example by means of a stiff leaf spring transmitting its pressure from the clamping frame bolt heads to the center of the end plate by means of a tempered metal ball resting in a tapered recess in the center of the end plate and constituting a ball and socket joint. To protect the stack against mechanical and thermal influences the end plates and leaf spring just mentioned, as well as the entire stack, are enclosed in a plastic dielectric material such as wax, for example, as a stack-embedment.

The stack just described is adapted to remain substantially constant in capacity but it is extremely difficult and expensive to get a capacitor stack to have the precise capacity value desired, since that ordinarily would and did require a high labor cost in many times cutting down or adding to the foil area of an end layer, clamping and unclamping and reclamping the stack, and in fact since the embedding dielectric material causes changes in the capacity of the stack, it becomes prohibitive in cost to insert and remove the embedment many times in order to get the high degree of precision desired. To eliminate this a small adjustable auxiliary capacitor is provided of only a few percent of or even much less capacity than the stack first described and this small adjustable capacitor is made accurately and readily adjustable by small increments so that great precision is attainable in the total value of the combined capacitor. A special feature of this auxiliary or vernier capacitor is its construction in a manner to be practically unaffected by temperature changes, mechanical shock or other factors likely to affect its constancy in a given position of adjustment. The vernier capacitor is connected preferably in parallel with the main capacitor so that the capacity of the combination may be constant and precise to a high degree. To contribute to the constancy of the combination both capacitors are mounted within a metal container shielding not only both capacitors but their connections inside the container from outside influences. As illustrative of the degree of precision desired, the screws holding the insulating cover in place on such metallic container or casing are located adjacent the edges of the casing so that capacity changes due to these screws or to a screw driver operating them is reduced to a minimum. The vernier capacitor is made adjustable from outside the casing.

Specifically the auxiliary adjustable capacitor structure includes a slidable armature adjusted by a fine screw thread to control the effective area by overlapping with two stationary armatures, one on each side of the movable armature. Springs clamp the stationary armatures against the movable armatures with mica or other dielectric between them. The armatures are thus made slightly yieldable by way of the springs so as to better withstand mechanical shock.

Referring to the drawings.

Figure 1:
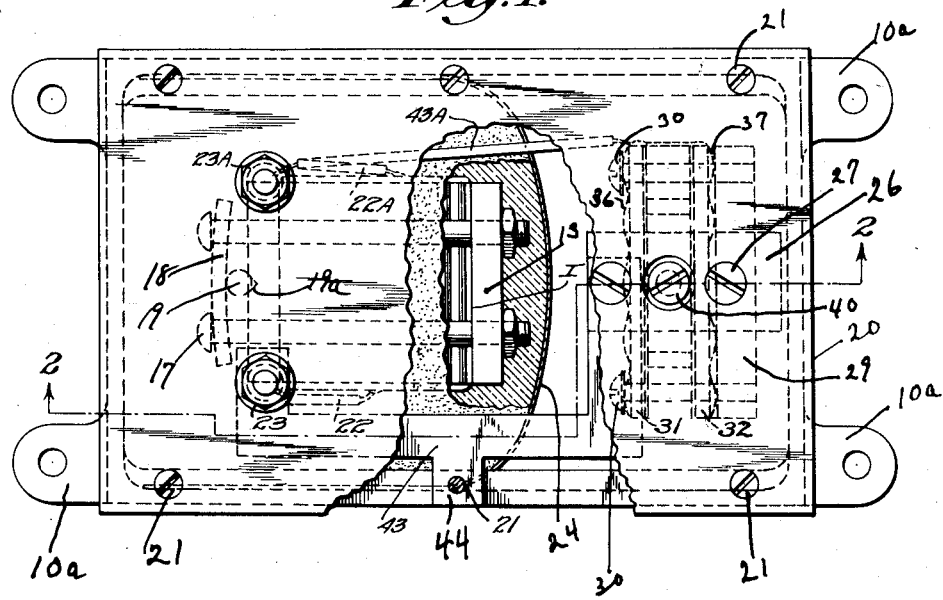
Fig. 1 is a top plan view of the complete unit embodying this invention, a portion of the casing being broken away.
Figure 2:
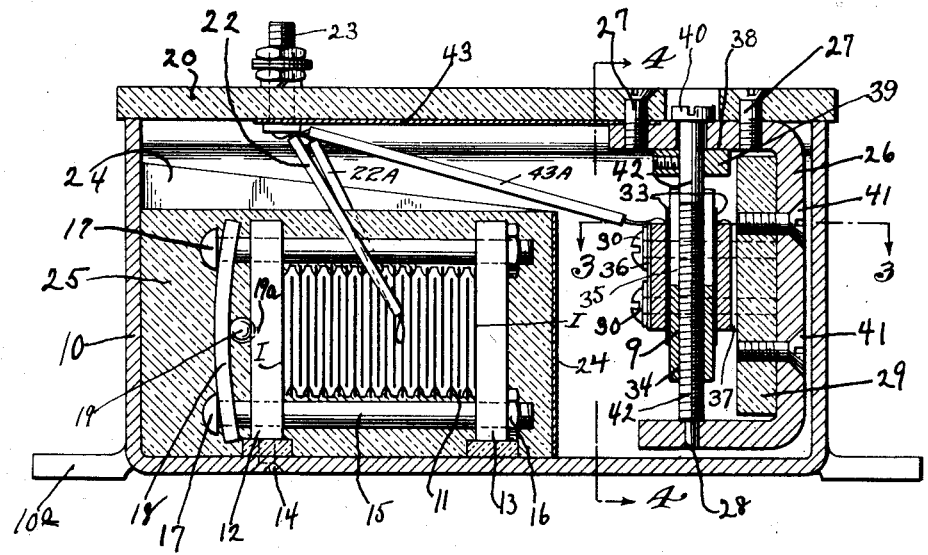
Fig. 2 is a vertical section on the line 2—2 of Fig. 1.

A small variable capacitator 9 is mounted within a metal case 10 provided with suitable mounting lugs 10a together with a capacitor 11 of substantially larger and constant capacity. The stack 11 is made up of sheets of mica and foil and divided into sections, as shown in Fig. 2, which may be connected either in multiple or series or multiple series, as desired. The stack 11 is clamped between the metallic end plates 12 and 13 by means of the bolts 15, the insulating sheets I separating the said plates from the ends of the stack. The plates 12, 13 and bolts 15 are grounded to the casing 10 by the screw 14 shown in Fig. 2. The bolts 15 are provided at one end with nuts 16 and with heads 17 at their opposite ends, a strong leaf spring 18 being arranged as illustrated beneath the heads 17 so that as the nuts 16 are tightened, pressure of the spring 18, equal, say, to about 350 lbs. per square inch is transmitted to the center of the plate 12 by means of the hardened thrust ball 19 received in a tapered recess 19a in the plate 12. The plates 12 and 13 are loosely fitted on the bolts 15. A cover 20 of a phenolic condensation product or other insulating material is secured to the container 10 by means of the screws 21, Fig. 1. The terminal lead 22 connects a point on one side of the condenser stack 11 with the connecting post 23 on the cover, said post being provided with the usual nuts and washers. The other side of the stack 11 is connected at another point to the other post 23A by lead 22A. Upon connection of the stack 11 with the terminal post 23 a partition 24 of stiff material such as fish paper or the like is passed around said stack so as to permit wax 25 to be poured around and embed and seal the stack 11 without having the wax contact with the variable condenser 9. The wax is a paraffin product having a melting point of about 73° C.

Figure 3:
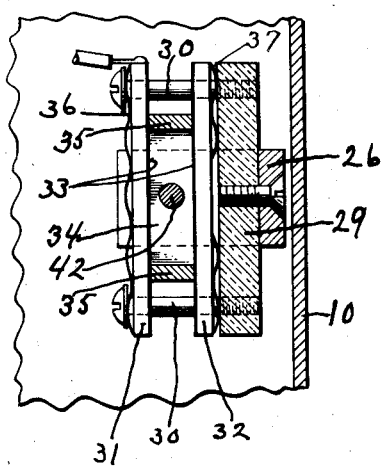
Fig. 3 is a horizontal section on the line 3—3 of Fig. 2, showing a plan of parts of the adjustable condenser.
Figure 4:
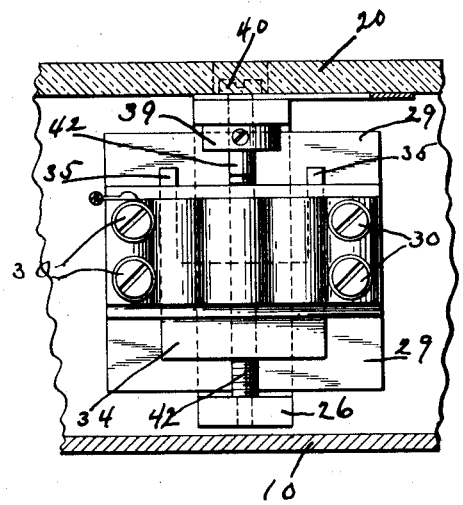
Fig. 4 is a section on the line 4—4 of Fig. 2, showing a left end elevation of parts of the adjustable condenser.

The vernier or variable capacitor 9 is supported in place in metal casing 10 by means of a metal U-shaped bracket 26 secured to the insulating cover 20 by screws 27. A bearing 28 in the lower arm of the U member 26 supports the vertical rotatable member 42 provided with fine pitch screw threads and the top-slotted adjusting head 40. A block of insulating material 29 of the same composition as the cover 20 is secured by screws 41 to the base of the U bracket 26. Screwed into the insulating block or base 29 so as to be insulated from the bracket 26 are the bolts or rods 30 shown in Figs. 2, 3 and 4. Mounted on these rods or bolts are the spaced metal plates 31 and 32, Fig. 3. Also mounted on the bolts 30 contiguous to plates 31 and 32 are thin mica sheets 33. Slidable between the mica sheets is the movable armature plate 34 of the general shape shown in Fig. 4, and provided or formed as shown with spaced guides 35, which constantly space apart the fixed mica and metal plates 33, 31, 32. This variable capacitor depends on the area of the main body portion of the inside movable plate 34 inserted between the armature plates 31 and 32 for adjustment of capacity. The plate 34 is threaded on and carried by the rotatable stem 42 and is adjusted by way of the slotted head 40, as by a screw-driver, for variation in capacity. The plates 31 and 32 are engaged by springs 36 and 37, Fig. 3, which are compressed on tightening the bolts 30 and press said plates against the mica sheets 33 and in turn press said mica sheets against the movable plate 34 whereby the spacing between the movable and stationary plates is maintained substantially constant. A collar 39 is screwed to the spindle or stem 42, Fig. 4, and a lockwasher 38 inserted between this collar and the upper arm of the U bracket 26 as a brake in order to provide sufficient friction to maintain the threaded stem 42 and the movable plate 34 in their desired positions of adjustment and oppose these parts getting out of adjustment accidentally through mechanical shock or otherwise. In the embodiment illustrated the variable capacitor is constructed so that with a quarter turn given the slotted head 40, the movable plate 34 is adjusted so as vary the capacity of the complete unit 9, 11 only about 1/20 of 1% and in this way said unit is given its accurate capacity. The stationary armature plates 31 and 32 together with the dielectric sheets 33 and the sliding armature plate 34 constitute a bearing for the threaded stem 42 to guide the latter and maintain it in an upright position so that the stem 42 need have no bearing in the upper arm of the metallic U bracket 26. The springs 36 and 37 maintain substantially constant pressure on the dielectric sheets 33 and therefore substantially permanent spacing of the stationary and movable plates 31, 32, 34 so that the capacity value of this vernier capacitor should be substantially unaffected by the usual temperature changes encountered.

Figure 5:
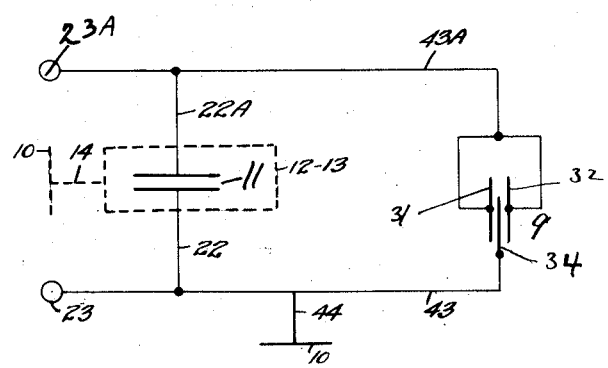
Fig. 5 illustrates the electrical connection between the two condensers of the unit.

Fig. 5 shows the manner in which the two capacitors, the fixed one 11 and the variable one 9, may be connected in parallel with one another relative to exterior terminals 23, 23A on the insulating cover 20 of the metal casing 10, by way of the leads inside the casing from the two capacitors to said exterior terminals. The fixed capacitor 11 is connected at any two desired points to the two terminals 23, 23A respectively by the interior leads 22, 22A; and the variable capacitor 9 is connected to the same terminals 23, 23A respectively by leads 43, 43A; so that the two capacitors are connected in parallel with one another across terminals 23, 23A. In order substantially to shield the two capacitors from the effects of electrical influence outside the metal casing 10, which might cause variation of total capacity greater than that determinable by finely variable capacitor 9, the clamp 12—13 of the fixed capacitor is connected to the casing 10 respectively at 14, Figs. 2 and 5 and the two capacitors are connected to casing 10 at 44, Figs. 1 and 5. The plate-like form of lead 43 increases such electrostatic shielding effect over that provided by the metallic portion 10 of the housing casing; the metal plate 43 in effect constituting a partial metallic top closure for the casing, the exterior terminals 23, 23A being insulated from cover-plate 43 as by way of insulating means 20.

The stationary and movable armature plates 31, 32 and 34 may if desired for very high frequencies be made substantially discontinuous or provided with narrow slits to lessen the energy losses within them. Also the threaded stem 42 may, if desired, be constructed of insulating material in which case the movable plate will not be grounded through the stem as at 40 but a flexible connection will be made between the movable plate 34 and the bracket 26. Likewise the bolts 30 may be made of insulating material. Whether the bolts are made of insulating material or are of metal insulated from movable plate 34, they may desirably engage the sides of said movable plate and function as guides therefor in preventing lateral displacement. The metal plate 43 on the under face of the cover 20 is grounded to the bracket 26 as shown in Fig. 2 and to the metal casing 10 by the extension 44 shown in Fig. 1, whereby both capacitors of the unit are at least partially shielded. The plate 43 is shaped as shown in Fig. 1 of the drawings and connects the lowermost terminal shown on the cover in Fig. 1. The uppermost terminal on the cover in Fig. 1 is not connected with the plate 43 but is shown as being connected by the leads illustrated in dotted lines to both the fixed and adjustable condensers.

What is claimed is:

1. A capacitor of variable effective area which comprises spaced conducting elements, a solid dielectric between said elements, a spindle extending thru, and in both directions from, one of said conducting elements and having threaded engagement therewith to move it in its plane relative to the other conducting element; a stationary bearing for one of said spindle extensions; means holding said conducting and dielectric elements resiliently in operative relations and yieldingly supporting said spindle laterally; and means holding the spindle from axial movement; all whereby turning of the spindle on its said stationary bearing operates said movable conducting element in its plane in a direction transverse to the pressure of said resilient holding means.

2. A capacitor comprising an armature, another armature, a layer of dielectric material between said armatures, means for compressing said armatures against said dielectric material, means for sliding one armature over the other, at least one of said armatures being provided with spaced projections of substantially uniform and similar thickness to its body portion and extending from one side thereof to guide the sliding of the movable armature.

3. A variable capacitor which includes capacitor elements including a dielectric plate arranged in parallel planes, a casing housing said elements and having an insulating portion formed with at least three openings; a threaded metal spindle supported inside the casing for turning and having an operating end accessible from the exterior of the casing by way of one of said casing openings; two circuit terminals mounted over the other two casing-openings; one of the armatures of said capacitor units inside the casing being supported by an operating connection to said spindle by way of the threads thereon, said armature being movable in its own plane parallel to the plane of the cooperating capacitor elements, by turning of the threaded spindle, said spindle being supported longitudinally immobile in the casing; a lead inside the casing and electrically connecting the spindle to one of said circuit terminals; means supported inside the casing and holding stationary the capacitor elements cooperating with said movable armature; and a lead inside the casing and electrically connecting the second circuit terminal to an armature of the stationary capacitor elements.

4. A variable capacitor which includes capacitor elements including a dielectric plate ranged in parallel planes, a metallic casing housing said elements and formed with an opening for insertion of said elements; an insulating closure for said casing opening and itself formed with a relatively small opening; a threaded metal spindle supported inside the casing for turning and having an operating end accessible from the exterior of the casing by way of said opening in the insulating casing-closure; one of the armatures of said capacitor elements inside the casing being supported by an operating connection to said spindle by way of the threads thereon, said armature being movable in its own plane parallel to the planes of the cooperating capacitor elements, by turning of the threaded spindle; means supported inside the casing and holding stationary the capacitor elements cooperating with said movable armature; a circuit terminal mounted on said insulating casing-closure; and fixed conducting means inside the casing and connecting said threaded spindle to said circuit terminal, the latter being held longitudinally immobile.

5. A variable capacitor which includes a supporting base, rods having their ends secured therein; at least two perforated capacitor armatures and at least two perforated dielectric plates arranged in parallel planes; said rods extending thru the perforations in and supporting said capacitor elements; a movable armature free of said rods and facing and spacing apart said two dielectric plates; resilient means held in operative position by said rods and pressing together said capacitor elements including said movable armature, the latter being movable in its own plane; and means so moving said free armature; the capacitor elements other than the free movable armature constituting a bearing guide for the movement of said armature in its plane.

6. A variable capacitor which includes capacitor elements including armatures and intervening solid dielectric material arranged in parallel planes; a casing housing said elements and formed with an opening; means inside the casing holding stationary said dielectric material and one of said armatures; an operating spindle inside the casing but having an end projecting to said casing opening and there provided with means accessible from the exterior of the casing for turning the spindle; a cooperating armature being interiorly threaded and located adjacent the stationary dielectric material, and said spindle extending from said turning means thru said threaded armature and formed with threads engaging said armature threads providing for sliding movement of the threaded armature in its own plane along the surface of the stationary dielectric material, said dielectric constituting a guiding bearing for the threaded armature; the other end of the spindle projecting outside the threaded armature; and a journal for said projecting portion of the spindle and located inside the casing and supported thereby.

7. A variable capacitor which includes an operating spindle journaled for turning and formed with threads along its length; a capacitor armature having operating connection with said spindle by way of the threads thereon and movable in its own plane by turning of the spindle; cooperating capacitor elements including solid dielectric material arranged in planes parallel and close to said movable armature, said dielectric material lying adjacent the movable armature; resilient means pressing said cooperating capacitor elements together and pressing the dielectric material against the surface of said movable armature; and means continuously applied and braking the longitudinal movement of the threaded armature in its own plane.

8. A variable capacitor which includes an operating spindle journaled for turning and formed with threads along its length; a capacitor armature having operative connection with said spindle by way of the threads thereon and movable in its own plane by turning of the spindle; and cooperating capacitor elements including solid dielectric material arranged in planes parallel to said movable armature, the dielectric directly facing the surface of the movable armature; and means pressing said cooperating capacitor elements together and pressing said dielectric material against the surface of said movable armature, whereby the movable armature in its movement in its own plane slides along the facing surface of said dielectric material in contact therewith.

9. A variable capacitor which includes an operating spindle journaled for turning and formed with threads along its length; a capacitor armature having operating connection with said spindle by way of the threads thereon; cooperating capacitor elements including solid dielectric material arranged in planes parallel with said threaded armature; and means pressing said cooperating capacitor elements together and pressing the dielectric element against the surface of said threaded armature, said armature having guides for spacing apart said cooperating capacitor elements.

10. A variable capacitor which includes an operating spindle formed with threads along its length; a capacitor armature having operating connection with said spindle by way of the threads thereon and movable in its own plane by turning of the spindle; cooperating capacitor elements including solid dielectric material arranged in parallel planes, with the surface of the dielectric material adjacent the surface of said movable armature which slides along the surface of the dielectric material; and said movable armature being provided with spaced guides projecting from one of its ends and slidable with the armature along the surface of said dielectric material.

11. A variable capacitor which includes an operating spindle journaled for turning and formed with threads along its length; capacitor elements including armatures and intervening solid dielectric material arranged in parallel planes; and yielding means pressing the first armature and dielectric toward the second armature and holding the surface of the dielectric in intimate contact with the surface of the second armature; said second armature having an operating connection with said spindle by way of the threads thereon and movable in its own plane against the pressure of said yielding means upon turning of the spindle.

12. An adjustable capacitor of constant pressure of its elements, which includes at least two armatures and a sheet of dielectric material between them; means moving one of said armatures in its plane parallel to the other adjusting the capacity value by presenting more or less of the area of the movable armature to the facing area of the other armature; and means yieldingly pressing said armatures and dielectric sheet together preventing variation of the adjusted capacity value by variation of pressure between the armatures and dielectric sheet.

13. An adjustable capacitor which includes two rigid armatures having flat facing surfaces, a plate of dielectric material separate from said armatures but arranged between them, one of said armatures being threaded in a direction parallel to the armatures and slidable in its plane parallel to the neighboring face of the other armature, in a direction providing for adjustment of capacity value by presenting more or less of its area to the facing area of the other armature; leaf-spring means acting against the other armature in a direction toward the adjustable armature preventing variation of the adjusted capacity value by variation of pressure of the capacitor elements, said spring means being arranged for operation independent of the movement of the adjustable armature; a threaded turnable actuator engaging the threads of the adjustable armature and by its turning causing said movement of the latter and supporting the latter in position relative to the cooperating armature; and means supporting said actuator against movement in the direction of movement of the adjustable armature.

14. An adjustable capacitor which includes at least three armatures located respectively face to face in parallel positions with dielectric plates between them, the armature between the other two being movable parallel to them by sliding along the dielectric plates as slide-ways, and actuating means extending from said middle armature for causing such parallel sliding movement along the dielectric slide-ways, said actuating means being exposed from the adjacent armatures for accessibility for adjustment of the position of the middle armature, and the movements thereof causing variation of capacity value of the capacitor by variation of the active area of the movable middle armature relative to both the neighboring armatures on its opposite faces.

15. An adjustable capacitor which includes at least three armatures located respectively face to face in parallel positions with dielectric plates between them, the two outer armatures on the one hand, and the middle armature on the other hand, being relatively movable parallel to one another in sliding relation along the dielectric plates as slide-ways, causing variation of capacity value of the capacitor by relative sliding armature movement along the dielectric plates thereby varying the active area of the middle armature facing the outer armatures relative to the areas of both of them; and means for effecting such relative armature-movement and accessible for operation to effect said movement.

16. An adjustable capacitor which includes at least two armatures and dielectric material between them, means adjusting the capacity between said armatures, and means maintaining the various adjusted capacities and including means continuously and during adjustments pressing together the facing surfaces of the armatures and intervening dielectric material; the adjusting means being adapted to move one of said armatures parallel to the other during the application of pressure by said capacity-maintaining means, and said adjusting means for that purpose including a threaded actuator in threaded engagement with one of said armatures, and means supporting said actuator in axial alinement with movements of the threaded armature parallel to the other armature and in relations free for rotation but against movement parallel to the other armature.

WILLIAM M. BAILEY.